US006812322B2

(12) United States Patent
Bever et al.

(10) Patent No.: US 6,812,322 B2
(45) Date of Patent: Nov. 2, 2004

(54) POLYAMIDE

(75) Inventors: Paul-Michael Bever, Neustadt (DE); Ulrike Breiner, Bürstadt (DE); Bernd-Steffen von Bernstorff, Wachenheim (DE); Gerhard Conzelmann, Otterstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/312,363

(22) PCT Filed: Jun. 22, 2001

(86) PCT No.: PCT/EP01/07120

§ 371 (c)(1),
(2), (4) Date: Dec. 26, 2002

(87) PCT Pub. No.: WO02/00766

PCT Pub. Date: Jan. 3, 2002

(65) Prior Publication Data

US 2003/0125507 A1 Jul. 3, 2003

(30) Foreign Application Priority Data

Jun. 28, 2000 (DE) .......................... 100 30 515

(51) Int. Cl.$^7$ ......................... C08G 69/00; C08G 69/06; C08G 69/16

(52) U.S. Cl. ....................... 528/310; 528/170; 528/312; 528/323; 528/332; 528/335; 528/336; 525/195; 525/327.6; 525/375; 524/99; 524/103; 524/538; 524/600; 524/606; 428/357; 428/364; 428/394; 428/395; 442/49; 442/181

(58) Field of Search ................. 528/310, 170, 528/312, 335, 336, 323, 332; 525/195, 375, 327.6; 524/538, 103, 99, 600, 606; 428/357, 364, 394, 395; 442/49, 181

(56) References Cited

U.S. PATENT DOCUMENTS

| | | | | |
|---|---|---|---|---|
| 3,898,200 A | * | 8/1975 | Lofquist | 528/321 |
| 5,562,871 A | * | 10/1996 | Hoyt et al. | 264/130 |
| 5,618,909 A | * | 4/1997 | Lofquist et al. | 528/310 |
| 5,889,138 A | * | 3/1999 | Summers | 528/310 |
| 6,150,496 A | * | 11/2000 | Ilg et al. | 528/332 |
| 6,423,817 B1 | * | 7/2002 | Weinerth et al. | 528/310 |

FOREIGN PATENT DOCUMENTS

WO 99/41297 8/1999

OTHER PUBLICATIONS

Ullmann's Encyclopedia of Ind. Chem., 5$^{th}$ Ed. vol. 10 1987, 567–579.

* cited by examiner

Primary Examiner—P. Hampton Hightower
(74) Attorney, Agent, or Firm—Keil & Weinkauf

(57) ABSTRACT

A process for the preparation of novel polyamides, the use of such polyamides for the production of fibers, sheets and moldings, and fibers, sheets and moldings obtainable from such polyamides, are provided.

11 Claims, No Drawings

POLYAMIDE

The present invention relates to a process for the preparation of polyamides (VIII) obtainable from monomers (I) selected from the group consisting of lactams, ω-aminocarboxylic acids, ω-aminocarboxylic acid nitrites, ω-aminocarboxamides, ω-aminocarboxylic acid salts, ω-aminocarboxylic acid esters, equimolar mixtures of diamines and dicarboxylic acids, dicarboxylic acid/diamine salts, dinitriles and diamines, or mixtures of such monomers, wherein the polymerization of the monomers (I) is carried out in the presence of (II) 0.01 to 0.5% by weight of a sterically hindered piperidine derivative which has a functional group capable of amide formation with respect to the polyamide (VIII), (III) 0.01 to 0.5% by weight of a compound which has several amine groups capable of amide formation with respect to the polyamide (VIII), and optionally a compound selected from the group consisting of a compound (IV) which has an amine group capable of amide formation with respect to the polymer main chain of the polyamide (VIII), a compound (V) which has a carboxylic acid group capable of amide formation with respect to the polymer main chain of the polyamide (VIII), and a compound (VI), different from the monomer (I), which has several carboxylic acid groups capable of amide formation with respect to the polymer main chain of the polyamide (VIII), or mixtures thereof, the amounts of (I), (II), (III), (IV), (V) and (VI) adding up to 100%, the components (II), (III), (IV), (V) and (VI) being bonded to the polymer chain via amide linkages, and the sum of the amine groups of the components (II), (III) and (IV) capable of amide formation with respect to the polymer chain being greater than or equal to the sum of the carboxylic acid groups of the components (II), (V) and (VI) capable of amide formation with respect to the polymer chain.

The invention further relates to polyamides obtainable by this process, to the use of such polyamides for the production of fibers, textile fabrics and moldings, and to fibers, textile fabrics and moldings obtainable from such polyamides.

TECNICAL FIELD BACKGROUND ART

The use of polyamides for the production of fibers and yarns is generally known, for example from: Ullmann's Encyclopedia of Industrial Chemistry, 5th ed., vol. A10, VCH Verlagsgesellschaft mbH, Weinheim, Germany, 1987, pages 567–579.

Yarns are produced in a manner known per se by melting the polyamide, spinning it into a fiber and stretching, texturing and optionally aftertreating said fiber. This can be followed by cabling and heat setting of the yarn.

Setting processes are known per se, an example being the heat-set process from Hödrauf-Suessen, Germany.

An essential step of setting is the passage of the yarn through a climatic chamber under defined process conditions such as the residence time of the yarn and the temperature and relative humidity of the atmosphere in the climatic chamber.

The disadvantage here is that the quality, for example the APHA (Hazen) index according to European standard EN 1557 (corresponding to US standard ASTM D1003) and the relative viscosity of yarns from polyamides known per se, is markedly impaired during this setting. The drop in relative viscosity and the rise in APHA index indicate that the polymer has been degraded, i.e. damaged.

DISCLOUSURE OF INVENTION

It is an object of the present invention to provide polyamides which can be used to produce fibers, sheets or moldings, especially yarns, which do not exhibit said disadvantages, as well as processes which enable such polyamides to be prepared in a technically simple and economic manner.

We have found that this object is achieved by the process defined at the outset, polyamides obtainable by such a process, the polyamides defined at the outset, the use of such polyamides for the production of fibers, textile fabrics and moldings, and fibers, textile fabrics and moldings obtainable from such polyamides.

Polyamides are understood as meaning homopolymers, copolymers, mixtures and grafts of synthetic long-chain polyamides in which the essential constituent is recurring amide groups in the polymer main chain. Examples of such polyamides are nylon 6 (polycaprolactam), nylon 6,6 (polyhexamethylene adipamide), nylon 4,6 (polytetramethylene adipamide), nylon 6,10 (polyhexamethylene sebacamide), nylon 6,12 (polyhexamethylene decane-1,10-dicarboxamide), nylon 7 (polyenantholactam), nylon 11 (polyundecanolactam) and nylon 12 (polydodecanolactam). These polyamides are known to have the generic name nylon. Polyamides are also understood as meaning the so-called aramides (aromatic polyamides) such as polymetaphenylene isophthalamide (NOMEX® fiber, U.S. application Ser. No. 3,287,324) or polyparaphenylene terephthalamide (KEVLAR® fiber, U.S. application Ser. No. 3,671,542).

In principle, polyamides can be prepared by two processes.

In the polymerization of dicarboxylic acids and diamines, and in the polymerization of amino acids or derivatives thereof such as aminocarboxylic acid nitriles, aminocarboxamides, aminocarboxylic acid esters or aminocarboxylic acid salts, the amino and carboxyl end groups of the starting monomers or starting oligomers react with one another to form an amide group and water. The water can then be removed from the polymer mass. In the polymerization of carboxamides, the amino and amide end groups of the starting monomers or starting oligomers react with one another to form an amide group and ammonia. The ammonia can then be removed from the polymer mass. This polymerization reaction is conventionally referred to as polycondensation.

The polymerization of lactams as starting monomers or starting oligomers is conventionally referred to as polyaddition.

MODE(S) FOR CARRYING OUT THE INVENTION

According to the invention, monomers (I), selected from the group consisting of lactams, (ω-aminocarboxylic acids, ω-aminocarboxylic acid nitriles, (ω-aminocarboxamides, ω-aminocarboxylic acid salts, ω-aminocarboxylic acid esters, equimolar mixtures of diamines and dicarboxylic acids, dicarboxylic acid/diamine salts, dinitriles and diamines, or mixtures of such monomers, are used.

Suitable monomers (I) are monomers or oligomers of a $C_2$ to $C_{20}$, preferably $C_2$ to $C_{18}$, arylaliphatic or, preferably, aliphatic lactam such as enantholactam, undecanolactam, dodecanolactam or caprolactam, monomers or oligomers of $C_2$ to $C_{20}$, preferably $C_3$ to $C_{18}$, aminocarboxylic acids such as 6-aminohexanoic acid or 11-aminoundecanoic acid, dimers, trimers, tetramers, pentamers or hexamers thereof, and salts thereof such as alkali metal salts, for example lithium, sodium or potassium salts, $C_2$ to $C_{20}$, preferably $C_3$ to $C_{18}$, aminocarboxylic acid nitriles such as 6-aminohexanoic acid nitrile or 11-aminoundecanoic acid nitrile, monomers or oligomers of $C_2$ to $C_{20}$ amino acid amides such as 6-aminohexanamide or 11-aminoundecanamide, and dimers, trimers, tetramers, pentamers or hexamers thereof, esters, preferably $C_1$–$C_4$ alkyl esters, such as methyl, ethyl, n-propyl, i-propyl, n-butyl, i-butyl or s-butyl esters, of $C_2$ to $C_{20}$, preferably $C_3$ to $C_{18}$, aminocarboxylic acids, such as 6-aminohexanoic acid esters, for example methyl 6-aminohexanoate, or 11-aminoundecanoic acid esters, for example methyl 11-aminoundecanoate, monomers or oligomers of a $C_2$ to $C_{20}$, preferably $C_2$ to $C_{12}$, alkyldiamine, such as tetramethylenediamine or, preferably, hexamethylenediamine, with a $C_2$ to $C_{20}$, preferably $C_2$ to $C_{14}$, aliphatic dicarboxylic acid or mono- or dinitriles thereof, such as sebacic acid, decanedicarboxylic acid, adipic acid, sebacic acid dinitrile, decanoic acid dinitrile or adipodinitrile, and dimers, trimers, tetramers, pentamers or hexamers thereof, monomers or oligomers of a $C_2$ to $C_{20}$, preferably $C_2$ to $C_{12}$, alkyldiamine, such as tetramethylenediamine or, preferably, hexamethylenediamine, with a $C_{8\ to\ C20}$, preferably $C_8$ to $C_{12}$, aromatic dicarboxylic acid or derivatives thereof, for example chlorides, such as naphthalene-2,6-dicarboxylic acid or, preferably, isophthalic acid or terephthalic acid, and dimers, trimers, tetramers, pentamers or hexamers thereof, monomers or oligomers of a $C_2$ to $C_{20}$, preferably $C_2$ to $C_{12}$, alkyldiamine, such as tetramethylenediamine or, preferably, hexamethylenediamine, with a $C_9$ to $C_{20}$, preferably $C_9$ to $C_{18}$, arylaliphatic dicarboxylic acid or derivatives thereof, for example chlorides, such as o-, m- or p-phenylenediacetic acid, and dimers, trimers, tetramers, pentamers or hexamers thereof, monomers or oligomers of a $C_6$ to $C_{20}$, preferably $C_6$ to $C_{10}$, aromatic diamine, such as m- or p-phenylenediamine, with a $C_2$ to $C_{20}$, preferably $C_2$ to $C_{14}$, aliphatic dicarboxylic acid or mono- or dinitriles thereof, such as sebacic acid, decanedicarboxylic acid, adipic acid, sebacic acid dinitrile, decanoic acid dinitrile or adipodinitrile, and dimers, trimers, tetramers, pentamers or hexamers thereof, monomers or oligomers of a $C_6$ to C26, preferably $C_6$ to $C_{10}$, aromatic diamine, such as m- or p-phenylenediamine, with a $C_2$ to $C_{20}$, preferably $C_2$ to $C_{12}$, aromatic dicarboxylic acid or derivatives thereof, for example chlorides, such as naphthalene-2,6-dicarboxylic acid or, preferably, isophthalic acid or terephthalic acid, and dimers, trimers, tetramers, pentamers or hexamers thereof, monomers or oligomers of a $C_6$ to $C_{20}$, preferably $C_6$ to $C_{10}$, aromatic diamine, such as m- or p-phenylenediamine, with a $C_9$ to $C_{20}$, preferably $C_9$ to $C_{10}$, arylaliphatic dicarboxylic acid or derivatives thereof, for example chlorides, such as o-, m- or p-phenylenediacetic acid, and dimers, trimers, tetramers, pentamers or hexamers thereof, monomers or oligomers of a $C_7$ to $C_{20}$, preferably $C_8$ to $C_{18}$, arylaliphatic diamine, such as m- or p-xylylenediamine, with a $C_2$ to $C_{20}$, preferably $C_2$ to $C_{14}$, aliphatic dicarboxylic acid or mono- or dinitriles thereof, such as sebacic acid, decanedicarboxylic acid, adipic acid, sebacic acid dinitrile, decanoic acid dinitrile or adipodinitrile, and dimers, trimers, tetramers, pentamers or hexamers thereof, monomers or oligomers of a $C_7$ to $C_{20}$, preferably $C_8$ to $C_{18}$, arylaliphatic diamine, such as m- or p-xylylenediamine, with a $C_6$ to $C_{20}$, preferably $C_6$ to $C_{10}$, aromatic dicarboxylic acid or derivatives thereof, for example chlorides, such as naphthalene-2,6-dicarboxylic acid or, preferably, isophthalic acid or terephthalic acid, and dimers, trimers, tetramers, pentamers or hexamers thereof, monomers or oligomers of a $C_7$ to $C_{20}$, preferably $C_8$ to $C_{18}$, arylaliphatic diamine, such as m- or p-xylylenediamine, with a $C_6$ to C20, preferably $C_6$ to $C_{11}$, arylaliphatic dicarboxylic acid or derivatives thereof, for example chlorides, such as o-, m- or p-phenylenediacetic acid, and dimers, trimers, tetramers, pentamers or hexamers thereof, and homopolymers, copolymers, mixtures and grafts of such starting monomers or starting oligomers.

Preferred starting monomers or starting oligomers are those which polymerize to yield the polyamides nylon 6, nylon 6,6, nylon 4,6, nylon 6,10, nylon 7, nylon 11, nylon 12 and the aramides polymetaphenylene isophthalamide or polyparaphenylene terephthalamide, especially nylon 6 and nylon 6,6.

Unless indicated otherwise, the proportions by weight indicated for the compounds (II), (III), (IV), (V) and (VI) are based on the amount of monomer (I) used.

According to the invention, the polymerization of the monomer (I) is carried out in the presence of a sterically hindered piperidine derivative (II) which has a group capable of amide formation with respect to the polymer main chain of the polyamide (VIII), or mixtures thereof.

Suitable compounds (II) are preferably those of the formula

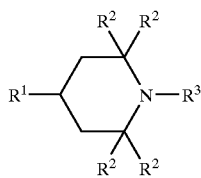

in which
R$^1$ is a functional group capable of amide formation with respect to the polymer main chain of the polyamide (VIII),
preferably a group —(NH)R$^5$, in which R$^5$ is hydrogen or C$_1$–C$_8$ alkyl, or a carboxyl group, or a carboxyl derivative, or a group —(CH$_2$)$_x$(NH)R$^5$, in which X is 1 to 6 and R$^5$ is hydrogen or C$_1$–C$_8$ alkyl, or a group —(CH$_2$)$_y$COOH, in which Y is 1 to 6, or a —(CH$_2$)$_y$COOH acid derivative, in which Y is 1 to 6,
especially a group —NH$_2$,
R$^2$ is an alkyl group, preferably a C$_1$–C$_4$ alkyl group such as methyl, ethyl, n-propyl, i-propyl, n-butyl, i-butyl, s-butyl, s-butyl, [sic]
especially a methyl group, and R$^3$ is hydrogen, C$_1$–C$_4$ alkyl or O—R$^4$, in which R$^4$ is hydrogen or C$_1$–C$_7$ alkyl,
R$^3$ being hydrogen in particular.

In such compounds, steric hindrance usually prevents the tertiary amino groups, and especially the secondary amino groups, of the piperidine ring systems from reacting.

A particularly preferred compound (II) is 30 4-amino-2,2,6,6-tetramethylpiperidine.

According to the invention, the compound (II) is used in amounts of at least 0.01% by weight, preferably of at least 0.05% by weight and particularly preferably of at least 0.1% by weight.

According to the invention, the compound (II) is used in amounts of at most 0.5% by weight, preferably of at most 0.3% by weight and particularly preferably of at most 0.2% by weight.

According to the invention, the polymerization of the monomer (I) is carried out in the presence of a compound (III) which has several, such as two, three or four, preferably two, amino groups capable of amide formation with respect to the polymer main chain of the polyamide (VIII), or mixtures thereof. Suitable compounds (III) are advantageously C$_2$ to C$_{20}$, preferably C$_2$ to C$_{12}$, alkyldiamines such as tetramethylenediamine or, preferably, hexamethylenediamine, C$_6$ to C$_{20}$, preferably C$_6$ to C$_{10}$, aromatic diamines such as m- or p-phenylenediamine, or C$_7$ to C$_{20}$, preferably C$_8$ to C18, arylaliphatic diamines such as m- or p-xylylenediamine, or those compounds which are conventionally used as chain regulators in the polymerization of the monomer (I). Hexamethylenediamine is particularly preferred.

Such compounds (III) can carry substituents such as halogens, for example fluorine, chlorine or bromine, sulfonic acid groups, or salts thereof such as lithium, sodium or potassium salts, or they can be unsubstituted.

According to the invention, the compound (III) is used in amounts of at least 0.01% by weight, preferably of at least 0.05% by weight and particularly preferably of at least 0.2% by weight.

According to the invention, the compound (III) is used in amounts of at most 0.5% by weight, preferably of at most 0.35% by weight and particularly preferably of at most 0.25% by weight.

According to the invention, the polymerization of the monomer (I) is optionally carried out in the presence of a compound (IV) which has an amino group capable of amide formation with respect to the polymer main chain of the polyamide (VIII), or mixtures thereof.

Suitable compounds (IV) are advantageously C$_2$ to C$_{20}$, preferably C$_2$ to C$_{12}$, alkylamines such as cyclohexylamine, C$_6$ to C$_{20}$, preferably C$_6$ to C$_{10}$, aromatic monoamines such as aniline, or C$_7$ to C$_{20}$, preferably C$_8$ to C$_{18}$, arylaliphatic monoamines such as benzylamine, or those compounds which are conventionally used as chain regulators in the polymerization of the monomer (I).

Such compounds (IV) can carry substituents such as halogens, for example fluorine, chlorine or bromine, sulfonic acid groups, or salts thereof such as lithium, sodium or potassium salts, or they can be unsubstituted.

The compound (IV) can advantageously be used in amounts of 0 to 0.5% by weight, preferably of 0 to 0.35% by weight and particularly preferably of 0 to 0.25% by weight.

According to the invention, the polymerization of the monomer (I) is optionally carried out in the presence of a compound (V) which has a carboxylic acid group capable of amide formation with respect to the polymer main chain of the polyamide (VIII), or mixtures thereof.

Suitable compounds (V) are advantageously C$_2$ to C$_2$, preferably C$_2$ to C$_{12}$, carboxylic acids such as acetic acid or propionic acid, C$_7$ to C$_{21}$, preferably C$_7$ to C$_{11}$, aromatic carboxylic acids such as benzoic acid, or C$_8$ to C$_{21}$, preferably C$_9$ to C$_{19}$, arylaliphatic carboxylic acids, or those compounds which are conventionally used e.g. as chain regulators in the polymerization of the monomer (I).

Such compounds (V) can carry substituents such as halogens, for example fluorine, chlorine or bromine, sulfonic acid groups, or salts thereof such as lithium, sodium or potassium salts, or they can be unsubstituted.

The compound (V) can advantageously be used in amounts of 0 to 0.5% by weight, preferably of 0 to 0.35% by weight and particularly preferably of 0 to 0.25% by weight.

According to the invention, the polymerization of the monomer (I) is optionally carried out in the presence of a compound (VI), different from the monomer (I), which has several, such as two, three or four, preferably two, carboxylic acid groups capable of amide formation with respect to the polymer main chain of the polyamide (VIII), or mixtures thereof.

Suitable compounds (VI) are advantageously C$_2$ to C$_{20}$, preferably C$_2$ to C$_{12}$, dicarboxylic acids such as sebacic acid, dodecanoic acid, cyclohexane-1,4-dicarboxylic acid or, preferably, adipic acid, C$_8$ to C$_{22}$, preferably C$_8$ to C$_{12}$, aromatic dicarboxylic acids such as benzene- and naphthalenedicarboxylic acids, preferably naphthalene-2,6-dicarboxylic acid, isophthalic acid or terephthalic acid, or C$_9$ to C$_{22}$, preferably C$_9$ to C$_{20}$, arylaliphatic dicarboxylic acids, or those compounds which are conventionally used as chain regulators in the polymerization of the monomer (I). Terephthalic acid and isophthalic acid are particularly preferred.

Such compounds (VI) can carry substituents such as halogens, for example fluorine, chlorine or bromine, sulfonic acid groups, or salts thereof such as lithium, sodium or potassium salts, or they can be unsubstituted.

Preferred compounds (VI) are sulfonated dicarboxylic acids, especially sulfoisophthalic acid, and one of its salts such as its alkali metal salts, for example the lithium, sodium or potassium salt, preferably the lithium or sodium salt and particularly preferably the lithium salt.

The compound (VI) can advantageously be used in amounts of 0 to 0.5% by weight, preferably of 0 to 0.35% by weight and particularly preferably of 0 to 0.25% by weight.

Particularly advantageously, the compound (VI) can be used in amounts such that the molar amount of the carboxylic acid groups of the compound (VI) capable of amide formation with respect to the polymer main chain of the polyamide (VIII) is less than the molar amount of the amine groups of the compound (III) capable of amide formation with respect to the polymer main chain of the polyamide (VIII).

According to the invention, the amounts of (I), (II), (III), (IV), (V) and (VI) add up to 100%.

According to the invention, the components (II), (III), (IV), (V) and (VI) are bonded to the polymer chain via amide linkages.

According to the invention, the sum of the amine groups of the components (II), (III) and (IV) capable of amide formation with respect to the polymer chain is greater than or equal to, preferably greater than, the sum of the carboxylic acid groups of the components (II), (V) and (VI) capable of amide formation with respect to the polymer chain.

The compounds of formulae (II), (III), (IV), (V) and (VI) can be added to the starting monomers (I) or the polymerizing reaction mixture and can be bonded to the polymer main chain of the polyamide by reaction of at least one of the amide-forming groups.

The process according to the invention yields polyamides with the advantageous properties mentioned at the outset.

The polymerization or polycondensation of the starting monomers (I) in the presence of the compounds (II), (III), (IV), (V) and (VI) is preferably carried out by the conventional processes. Thus the polymerization of caprolactam as the monomer (I) in the presence of (II), (III), (IV), (V) and (VI) can be carried out for example by the continuous or batch processes described in DE-A 14 95 198, DE-A 25 58 480, DE-A 44 13 177, Polymerization Processes, Interscience, New York, 1977, pp. 424–467, and Handbuch der Technischen Polymerchemie (Handbook of Industrial Polymer Chemistry), VCH Verlagsgesellschaft, Weinheim, 1993, pp. 546–554. The polymerization of AH salt as (I) in the presence of (II), (III), (IV), (V) and (VI) can be carried out by the conventional batch process (cf.: Polymerization Processes, Interscience, New York, 1977, pp. 424–467, especially 444–446) or by a continuous process, e.g. according to EP-A 129 196. In principle, (II), (III), (IV), (V), (VI) and the starting monomers (I) can be fed into the reactor separately or as a mixture.

In another preferred embodiment, the polymerization or polycondensation by the process according to the invention is carried out in the presence of at least one pigment. Preferred pigments are titanium dioxide, preferably in the form of the anatase modification, or colorizing compounds of an inorganic or organic nature. The pigments are preferably added in an amount of 0 to 5 parts by weight, especially of 0.02 to 2 parts by weight, based in each case on 100 parts by weight of polyamide. The pigments can be fed into the reactor with the starting materials or separately therefrom. The use of (II), (III), (IV), (V) and (VI) (including as chain regulator constituent) markedly improves the properties of the polymer compared with a polymer which contains only pigment and no compounds (II), (III), (IV), (V) and (VI), or only pigment and a combination of compounds (II), (III), (IV), (V) and (VI) falling outside the process defined at the outset.

The polyamides according to the invention can advantageously be used for the production of threads, fibers, sheets, textile fabrics and moldings. Threads obtained from polyamides, especially polycaprolactam, by fast spinning at drawing-off speeds of at least 4 000 m/min are particularly advantageous. The threads, fibers, sheets, textile fabrics and moldings obtained using the polyamides according to the invention can have a variety of uses, for example as textile clothing or carpet fibers.

EXAMPLES

Heat setting was carried out by the Hörauf-Suessen heat-set process on a GVA 5000 yarn finishing unit with the following parameters:

thread count: 6 temperature: 190–200° C.

residence time: 40–60 seconds dew point: 88–98° C.

The APHA index was determined according to European standard EN 1557 against a Pt-Co standard.

The relative viscosity was determined by weighing 500 mg of the sample into a 50 ml volumetric flask and making up to the mark with 96% by weight sulfuric acid. The sample was dissolved to give a homogeneous solution.

In an Ubbelohde No. II viscometer, the flow time between the upper and lower calibration marks was determined at 25° C. ±0.05° C. The measurements were repeated until three successive measurements fell within a 0.3 second range. The flow time was determined for the solvent in the same way. The relative viscosity (RV) was determined according to $$RV = T/T_0$$

where: T: flow time of solution $T_0$: To flow time of solvent

The amounts indicated in the Examples for the compounds TAD, HMD and TPA are in % by weight based on (I).

Comparison Examples 1–2, Example 1

Yarns were prepared from caprolactam as the monomer (I) with the compositions shown in Table 1 and the APHA values were determined before and after heat setting.

TABLE 1

| | TAD | HMD | TPA | APHA before setting | APHA after setting | RV before setting | RV after setting |
|---|---|---|---|---|---|---|---|
| Comp. Ex. 1 | 0.12 | — | 0.33 | 11 | 66 | 2.84 | 2.75 |
| Comp. Ex. 2 | — | 0.32 | — | 27 | 45 | 2.75 | 2.72 |
| Ex. 1 | 0.16 | 0.22 | — | 13 | 27 | 2.79 | 2.79 |

TAD: 4-amino-2,2,6,6-tetramethylpiperidine

HMD: hexamethylenediamine

TPA: terephthalic acid

We claim:

1. A process for the preparation of polyamides (VIII) obtainable from monomers (I) selected from the group consisting of lactams, ω-aminocarboxylic acids, ω-aminocarboxylic acid ni-triles, ω-aminocarboxamides, ω-aminocarboxylic acid salts, ω-ami-nocarboxylic acid esters, equimolar mixtures of diamines and di-carboxylic acids, dicarboxylic acid/diamine salts, dinitriles and diamines, or mixtures of such monomers, wherein the polymerization of the monomers (I) is carried out in the presence of (II) 0.01 to 0.5% by weight of a sterically hindered piperidine derivative which has a functional group capable of amide formation with respect to the polymer main chain of the polyamide (VIII), (III) 0.01 to 0.5% by weight of a compound which has several amine groups capable of amide formation with respect to the polymer main chain of the polyamide (VIII), and optionally a compound selected from the group consisting of a compound (IV) which has an amine group capable of amide formation with respect to the polymer main chain of the polyamide (VIII), a compound (V) which has a carboxylic acid group capable of amide formation with respect to the polymer main chain of the polyamide (VIII), and a compound (VI), different from the monomer (I), which has several carboxylic acid groups capable of amide formation with respect to the polymer main chain of the polyamide (VIII), or mixtures thereof, the amounts of (I), (II), (III), (IV), (V) and (VI) adding up to 100%, the components (II), (III), (IV), (V) and (VI) being bonded to the polymer chain via amide linkages, and the sum of the amine groups of the components (II), (III) and (IV) capable of amide formation with respect to the polymer chain being greater than or equal to the sum of the carboxylic acid groups of the components (II), (V) and (VI) capable of amide formation with respect to the polymer chain.

2. A process as claimed in claim 1 wherein the compound (III) has two amine groups capable of amide formation with respect to the polyamide (VIII).

3. A process as claimed in claim 1 wherein hexamethylenediamine is used as the compound (III).

4. A process as claimed in claim 1 wherein 4-amino-2,2,6,6-tetramethylpiperidine is used as the compound (II).

5. A process as claimed in claim 1 wherein the compound (VI) has two carboxylic acid groups capable of amide formation with respect to the polyamide (VIII).

6. A process as claimed in claim 1 wherein a sulfonated dicarboxylic acid is used as the compound (VI).

7. A process as claimed in claim 1 wherein sulfoisophthalic acid or one of its salts is used as the compound (VI).

8. A polyamide (VIII) obtainable by a process as claimed in claim 1.

9. A fiber obtainable from a polyamide (VIII) as claimed in claim 9.

10. A textile fabric obtainable from a polyamide (VIII) as claimed in claim 8.

11. A molding obtainable from a polyamide (VIII) as claimed in claim 8.

* * * * *